(12) United States Patent
Hagen

(10) Patent No.: US 11,448,343 B2
(45) Date of Patent: Sep. 20, 2022

(54) FASTENING MEANS FOR FASTENING OF A CABLE TO A TUBULAR BODY

(71) Applicant: Innovar Engineering AS, Sola (NO)

(72) Inventor: Karluf Hagen, Randaberg (NO)

(73) Assignee: Innovar Engineering AS, Sola (NO)

( * ) Notice: Subject to any disclaimer, the term of this patent is extended or adjusted under 35 U.S.C. 154(b) by 570 days.

(21) Appl. No.: 16/464,328

(22) PCT Filed: Nov. 15, 2017

(86) PCT No.: PCT/NO2017/050293
§ 371 (c)(1),
(2) Date: May 28, 2019

(87) PCT Pub. No.: WO2018/097735
PCT Pub. Date: May 31, 2018

(65) Prior Publication Data
US 2021/0108741 A1     Apr. 15, 2021

(30) Foreign Application Priority Data
Nov. 28, 2016    (NO) .................................... 20161896

(51) Int. Cl.
*F16L 3/04*         (2006.01)
*F16L 3/06*         (2006.01)
(Continued)

(52) U.S. Cl.
CPC .............. *F16L 3/04* (2013.01); *E21B 17/026* (2013.01); *E21B 17/1035* (2013.01); *F16L 3/06* (2013.01);
(Continued)

(58) Field of Classification Search
CPC ... F16L 3/08; F16L 3/10; F16L 3/1033; F16L 3/12; F16L 3/1008; F16L 3/22;
(Continued)

(56) References Cited

U.S. PATENT DOCUMENTS 2,858,093 A    10/1958  Knoll
4,307,755 A *  12/1981  Schmidt .................. F16L 11/12
                                              138/103
(Continued)

FOREIGN PATENT DOCUMENTS

CA    1 203 267      4/1986
CN    202718635      2/2013
(Continued)

OTHER PUBLICATIONS

Norweigan Search Report, Norwegian Patent Application No. 2061896, dated Apr. 19, 2017.
(Continued)

*Primary Examiner* — Tan Le
(74) *Attorney, Agent, or Firm* — Andrus Intellectual Property Law, LLP

(57) ABSTRACT

A fastening means is for attaching a cable to a tubular body. The tubular body has a sleeve with a first end face and a second end face. The fastening means has a first attachment part arranged with a first abutment surface for resting against the first end face; a second attachment part arranged with a second abutment surface for resting against the second end face; both the first attachment part and the second attachment part including a through cable recess; and a tightening device for pulling the first attachment part and the second attachment part towards each other. The fastening means is characterized by the first attachment part and the second attachment part being adjustably connected in a spaced-apart manner via the tightening device.

14 Claims, 5 Drawing Sheets

(51) Int. Cl.
*E21B 17/02* (2006.01)
*E21B 17/10* (2006.01)
*B25B 21/00* (2006.01)
*B23P 19/06* (2006.01)
*F16L 3/08* (2006.01)

(52) U.S. Cl.
CPC ............. *B23P 19/061* (2013.01); *E21B 17/02* (2013.01); *F16L 3/08* (2013.01)

(58) Field of Classification Search
CPC ....... F16L 3/02; F16L 3/04; F16L 3/06; F16L 3/085; F16L 3/1083; E21B 17/026; E21B 17/1035; E21B 17/043; E21B 17/02; B23P 19/061
USPC .......................................................... 138/103
See application file for complete search history.

(56) References Cited

U.S. PATENT DOCUMENTS

| | | | | | |
|---|---|---|---|---|---|
| 4,422,702 | A * | 12/1983 | Nordeen | ............. | H01R 13/005 439/191 |
| 4,484,785 | A * | 11/1984 | Jackson | ............. | E21B 17/1035 138/110 |
| 5,379,836 | A * | 1/1995 | Jordan | ................ | E21B 17/1035 166/241.6 |
| 6,023,027 | A * | 2/2000 | Neff | .................... | E21B 17/1035 138/110 |
| 10,415,609 | B2 * | 9/2019 | Golden | ................ | F16M 13/022 |
| 2002/0030144 | A1 * | 3/2002 | Blane | .................... | H02G 9/065 248/74.1 |
| 2005/0191889 | A1 * | 9/2005 | Jordan | ................. | E21B 43/128 439/320 |
| 2008/0283687 | A1 * | 11/2008 | McClure | ................. | F16L 3/237 248/74.1 |
| 2010/0193200 | A1 * | 8/2010 | Rioufol | ................ | E21B 33/134 166/387 |
| 2011/0006512 | A1 * | 1/2011 | James | ..................... | F16L 57/00 285/45 |
| 2016/0047174 | A1 * | 2/2016 | O'Brien | ............. | E21B 17/1035 166/243 |
| 2016/0097243 | A1 * | 4/2016 | Noakes | ................. | E21B 17/206 166/105 |

FOREIGN PATENT DOCUMENTS

| | | |
|---|---|---|
| GB | 7753 336 | 9/1956 |
| NO | 335999 | 11/2014 |
| WO | 2006/005895 | 1/2006 |
| WO | 2008/011950 | 1/2008 |
| WO | 2014/180816 | 11/2014 |

OTHER PUBLICATIONS

International Search Report, PCT/NO2017/050293, dated Jan. 26, 2018.
Written Opinion, PCT/NO2017/050293, dated Jan. 26, 2018 and Reply dated Jun. 19, 2018.
International Preliminary Report on Patentability, PCT/NO2017/050293, dated Jul. 12, 2018.

* cited by examiner

II-II

FASTENING MEANS FOR FASTENING OF A CABLE TO A TUBULAR BODY

CROSS-REFERENCE TO RELATED APPLICATIONS

This application is the U.S. national stage application of International Application PCT/NO2017/050293, filed Nov. 15, 2017, which international application was published on May 31, 2018, as International Publication WO 2018/097735 in the English language. The International Application claims priority of Norwegian Patent Application No. 20161896, filed Nov. 28, 2016. The international application and Norwegian application are both incorporated herein by reference, in entirety.

FIELD

The invention relates to a fastening means for fastening a cable to a tubular body. More particularly, it relates to a device for attaching a cable to a tubular body, the tubular body comprising a sleeve or collar which is provided, at its end portions, with a first end face and a second end face, respectively. The fastening means is arranged to rest against the sleeve and has at least one through cable recess.

BACKGROUND

Along with a pipe string that extends down a well, one or more cables usually extend parallel with and on the outside of the pipe string. This will typically be cables for the transfer of power and communication between the surface and components in the well. For such cables not to hang loose, the cables must be attached to the pipe string. Today the attachment is usually made by means of a hinge/clamp which is clamped around the pipe string and which is secured by means of one or more bolts. The attachment is usually made at the transition between two pipes in the string, for example at a threaded sleeve between two production tubing joints. U.S. Pat. No. 5,379,836 shows an example of such a clamp.

WO 2008/11950 A1 discloses a clamping device for the protection and securing of cables and wires on an outer surface of an elongated body. The clamping device comprises a first element in the form of two end elements with inner surfaces that are complementary to the elongated body, the two end elements being connected by a rib element and at least one second body in the form of a bow. The clamping device is clamped around the elongated body.

WO 2006/005895 A1 discloses a control-cable protector which includes a section protecting one or more cables, and two end sections. The section and the end sections can be connected to each other in a lockable manner and attach the control-cable protector to a tubular body.

CN 202718635 U discloses a cable protector comprising a clamp and a locking ring.

Patent publication NO335999B1 discloses a cable-protection device for protecting cables extending over a collar on a pipeline. In a direction along the pipeline, the cable-protection device has a length that is longer than the collar, and a recess substantially corresponding to the length of the collar. Each end of said recess is provided with coupling means, preferably including a spring, for tightening against the collar ends, so that the cable-protection device sits comfortably on the collar.

The annulus outside the pipe string, which is often defined by a casing, has a limited radial extent, and it has therefore turned out to be difficult to provide fastening devices of sufficient strength.

It is in particular when the pipe string is being lowered into the well, that great forces may act on the attachment. On several occasions, it has turned out that today's fastening devices do not have sufficient strength to withstand the loads to which they may become subjected. This has turned out to be a particularly great challenge on floating rigs in large waves.

A problem with fastening devices of the most common type, as mentioned above, is that bolts that are tightened to bind the hinge together, will loosen over time because of vibrations in the well. Today's fastening devices are therefore prone to coming loose, which results in production stops and lost working time as loose parts will have to be fished out of the well. It goes without saying that such production stops may be very expensive.

This is the problem that the cable-protection device according to NO335999B1 is aimed at solving as it is arranged in such a way that there are no external bolts.

The fastening means for a cable must be able to withstand a load corresponding to the weight of a production tubing in a petroleum well, for example. This weight may amount to 200-300 tonnes. In addition, there will be lateral forces in the well, and these may twist the fastening means, and thereby the cable, relative to the pipe. Such twisting will result in the cable getting into a helical shape around pipe and gradually being torn off. A requirement for fastening means of this type is therefore that they shall be able to resist a load of 5 tonnes shifting from side to side (a torsional resistance of 5 tonnes shifting). This is checked by subjecting the fastening means to a vigorous vibration test, for example the test that is referred to as the Exxon test in the trade. A fastening means for a cable must have passed the above-mentioned test, and other tests, to be considered at all for use in the petroleum industry.

The cable-protection device according to NO335999131, as mentioned above, has the drawback of there being very limited space for the coupling means at the ends of the second recess. It will not be possible to provide a spring force great enough to resist the weight of a production tubing. Further, with a spring-based solution it will not be possible to withstand the above-mentioned lateral forces.

The present applicant's unpublished Norwegian patent application No. 20150678 discloses a fastening means that solves said challenges. As the invention described herein is an advancement of the invention disclosed in said unpublished patent application, there will, in what follows, first be given a description of the content of the patent application No. 20150678 and then a description of the new invention.

In Norwegian patent application No. 20150678, a fastening means for attaching a cable to a tubular body is disclosed, the tubular body including a sleeve which is provided with inside bevels at its end portions. The fastening means utilizes the inside bevels of the sleeve for the attachment of a cable to the tubular body and is well suited in production wells in which the annulus has a relatively limited extent. The fastening means is arranged to rest against the sleeve and has at least one through cable recess. The fastening means is characterized by being formed with a first hook and a second hook, respectively, at each of its end portions, the hooks complementarily fitting the bevels of the sleeve, the fastening means comprising a first clamp part, or attachment part, which has the first hook, and a second clamp part, or attachment part, which has the second hook, and the fastening means being provided with tightening means for the hooks.

The kind of sleeve involved here is formed with inside bevels at its end portions. The bevel may appear naturally by the sleeve being formed with inside, conical threads, or the bevel may be prefabricated with a view to this type of attachment. The bevel may be arranged to constitute an entering aid when a threaded pipe is entering the sleeve.

The first and second hooks are adapted for the bevels so that the hooks, in the tightened state, have been moved into their respective bevels and the fastening means is gripping the respective end portions of the sleeve. In this position, the fastening means is prevented from being displaceable relative to the sleeve, in both the radial and the axial directions.

In one embodiment, the tightening means include at least one threaded bolt. Alternatively, other known tightening methods may be used. An example is hydraulic tightening together with, for example, locking dogs.

In one embodiment, an access opening to the threaded bolt may have a smaller diameter than the largest diameter of the threaded bolt. It is thereby ensured that the threaded bolt, if it should come loose, is prevented from falling out of the fastening means.

By moving the attachment parts towards each other, the hooks are moved into their respective bevels, after which they are tightened against the sleeve.

In one embodiment, the first attachment part may be provided with a guiding bead, or guiding lip, displaceably fitting into a guiding recess in the second attachment part. This lip-and-recess feature prevents the attachment parts from being displaced relative to each other around the sleeve. In one embodiment, to keep the cable in position also in the axial direction relative to the tubular body, the cable recess has a smaller height than the thickness of the cable.

A method of attaching a cable to a tubular body is described as well, wherein the tubular body includes a sleeve which is provided with inside bevels at its end portions, and wherein a fastening means is arranged to rest against the sleeve and has at least one through cable recess, the method being characterized by including:
clamping the fastening means, which is formed with a first hook and a second hook, respectively, at its end portions, against the sleeve, the cable being placed in the cable recess; and
pulling the hooks into their respective bevels in the sleeve by means of tightening means.

Because of a desired clamping of the cable between the sleeve and the fastening means, it may be necessary to use a clamping device to hold the fastening means firmly against the sleeve when the hooks are to be moved into their respective bevels.

In one embodiment, during the pulling, the method may include moving a guiding lip that is in a first attachment part into a guiding recess that is in a second attachment part.

The fastening means and the method according to Norwegian patent application No. 20150678 thus provides a pipe clamp, or a fastening means, and a fastening method which are capable of absorbing the prevailing axial and radial forces. The fastening means also allows of a design without external fasteners and thereby less risk of components of the fastening means falling into the well.

SUMMARY

It is an object of the present invention to provide a simpler and more flexible fastening means, the fastening means being fit to resist the above-mentioned forces.

The object is achieved through the features that are indicated in the description below and in the claims that follow.

The invention is defined by the independent claims. The dependent claims define advantageous embodiments of the invention.

In a first aspect, the invention relates more specifically to a fastening means for attaching a cable to a tubular body, the tubular body including a sleeve with a first end face and a second end face, and the fastening means including:
a first attachment part arranged with a first abutment surface for resting against the first end face;
a second attachment part arranged with a second abutment surface for resting against the second end face;
both the first attachment part and the second attachment part including a through cable recess; and
a tightening device for pulling the first attachment part and the second attachment part towards each other. What is characteristic of the fastening means is that the first attachment part and the second attachment part are adjustably connected in a spaced-apart manner by means of the tightening device.

The fact that the two attachment parts are connected in a spaced-apart manner allows greater flexibility in relation to the above-mentioned solutions. That is to say, for the fastening means to be adapted for different sleeve lengths, it is only the tightening device that has to be changed. In an embodiment in which the tightening means include a threaded bolt, a shorter or longer threaded bolt may be chosen in relation to the desired length of the fastening means.

The through cable recess of the first attachment part may be aligned with the through cable recess of the second attachment part to ensure that the cable will get to lie in a straight line in the fastening means.

The first attachment part and the second attachment part may be identical. The effect of having identical attachment parts is that instead of having production of two different elements that are to be suitable for fitting together, the production may be simplified and only one type of attachment part be produced. Identical attachment parts are possible because the attachment parts are not connected directly to each other, but only via the tightening device.

Each of the first attachment part and the second attachment part may include a sleeve recess, defined by the abutment surface and a sleeve-abutment surface, to partially enclose the sleeve in a position of application. By a sleeve recess is thus meant herein a recess arranged to receive a portion of the sleeve. An effect of this is that the fastening means will get a good grip on the sleeve. These tightened contact faces (the abutment surface and the sleeve-abutment surface) against the threaded sleeve will contribute to resistance to twisting of the fastening means.

The abutment surface may be placed at an acute angle to the sleeve-abutment surface in order thus to provide a sloping abutment surface in which the lowermost part of the abutment surface forms a hook suitable for coming into abutment against at least a portion of the inside bevel of the sleeve when the tightening device is being tightened, in order thus to increase the contact surface between the sleeve and the fastening means.

The sleeve-abutment surface may comprise a first zone nearest to the abutment surface and a second zone arranged for tight contact with the sleeve in a position of application, the first zone being at least partially out of contact with the sleeve before the fastening means is tightened by means of the tightening device. By allowing some clearance, either in the form of a recess or in the form of a sloping surface which is not in contact with the surface of the sleeve, there will be room for compression down towards the surface of the sleeve as the tightening device is being tightened. A better grip is thus achieved between the fastening means and the tubular body; that is, both against the pipe and against the sleeve.

At least a portion of the abutment surfaces and/or the sleeve-abutment surfaces and/or the pipe-abutment surfaces may be provided with friction-enhancing means for increased friction between the fastening means and the tubular body and/or between the fastening means and the sleeve. Increased friction may be achieved by the surface of said portion being roughened, for example.

In a second aspect, the invention relates more specifically to a fastening means for attaching a cable to a tubular body, the tubular body comprising a sleeve with a first end face, a second end face and an external surface, the fastening means including:

- a first attachment part arranged with a first abutment surface for resting against the first end face, and a first sleeve-abutment surface arranged for contact against a portion of the external surface of the sleeve;
- a second attachment part arranged with a second abutment surface for resting against the second end face; and a second sleeve-abutment surface arranged for contact against a portion of the external surface of the sleeve;
- both the first attachment part and the second attachment part including a through cable recess; and
- a tightening device for pulling the first attachment part and the second attachment part towards each other. What is characteristic of the fastening means is that each of the sleeve-abutment surfaces includes a first zone nearest to the abutment surface and a second zone arranged for tight contact with the external surface of the sleeve, the first zone being at least partially out of contact with the sleeve before the fastening means is tightened by means of the tightening device.

By allowing the first zone to be placed at a distance from the external surface of the sleeve, that is to say providing some distance, either in the form of a recess or in the form of a sloping surface which is not in contact with the surface of the sleeve, there will be room for compression down towards the surface of the sleeve as the tightening device is being tightened. A better grip is thus achieved between the fastening means and the tubular body; that is, both against the pipe and against the sleeve.

The first attachment part and the second attachment part may be adjustably connected in a spaced-apart manner by means of the tightening device. The fact that the two attachment parts are connected in a spaced-apart manner allows greater flexibility in relation to the above-mentioned prior art and the solution according to the applicant's unpublished Norwegian patent application No. 20150678. That is to say, in order to adapt the fastening means for different sleeve lengths, it is only the tightening device that needs to be changed. In an embodiment in which the tightening means include a threaded bolt, a shorter or longer threaded bolt may be chosen in relation to the desired length of the fastening means.

At least a portion of the abutment surfaces and/or the sleeve-abutment surfaces and/or the pipe-abutment surfaces are provided with friction-enhancing means for increased friction between the fastening means and the tubular body and/or between the fastening means and the sleeve.

BRIEF DESCRIPTION OF THE DRAWINGS

In what follows, an example of a preferred embodiment according to the invention disclosed in Norwegian patent application No. 20150678 will be described first, and then an example of a preferred embodiment according to the present invention will be described, both being illustrated in the accompanying drawings, in which.

DETAILED DESCRIPTION OF THE DRAWINGS

Figure 1:
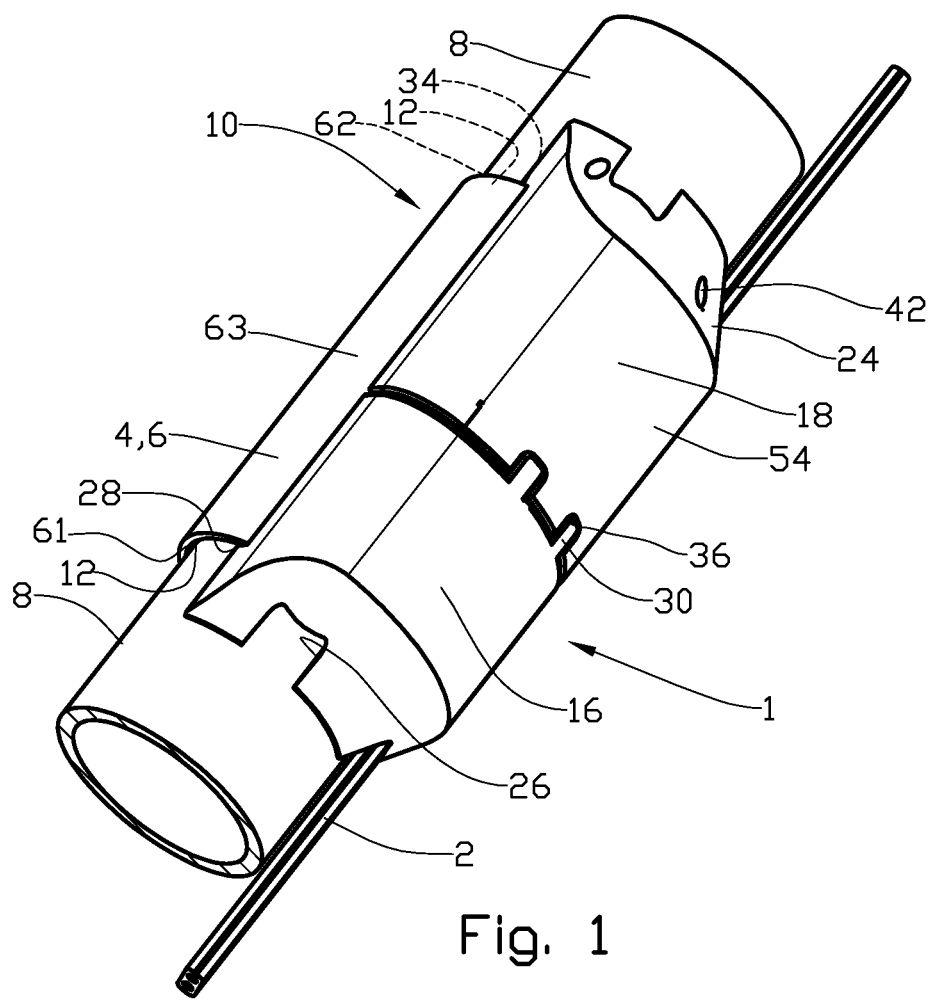
FIG. 1 shows a view in perspective of a section of a tubular body with a fastening means in accordance with the present applicant's Norwegian, unpublished patent application No. 20150678.
Figure 2:
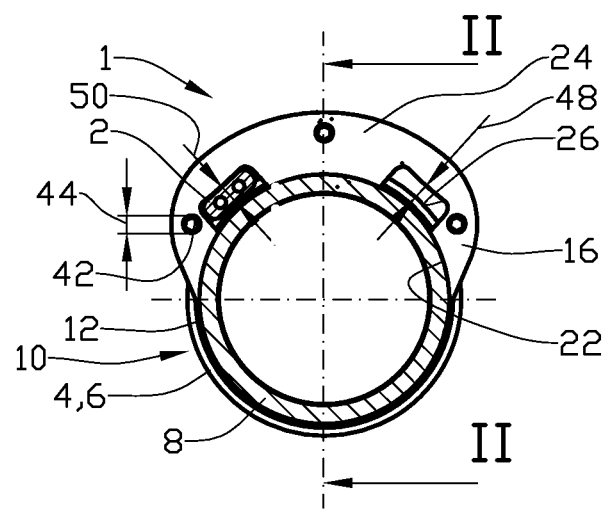
FIG. 2 shows an end view of the tubular body and the fastening means of FIG. 1.

FIGS. 1-5 shows the present applicant's invention specified in Norwegian patent application No. 20150678. Like or corresponding parts will be given the same reference numerals also in the description of FIGS. 6-8 which show the new invention. The new invention is an advancement of the attachment device according to Norwegian patent application No 20150678 and is therefore most easily described in connection therewith.

Reference is first made to FIGS. 1-5.

The reference numeral 1 indicates a fastening means for attaching a cable 2 to a tubular body 4, here in the form of a sleeve 6 which, together with pipe lengths 8, forms a pipe string 10.

At both its end portions, the sleeve 6 is formed with an inside bevel 12. The bevel 12 is clearly visible in FIG. 4. The bevel 12 makes a space, a gap, be formed between the sleeve 6 and the tubular body 4. At its end portions, the sleeve 6 is further provided with a first end face 61 and a s second end face 62, respectively. The sleeve 6 has an external surface 63.

The fastening means 1 includes a first attachment part 16 and a second attachment part 18. Together, the attachment parts 16, 18 span the length of the sleeve 6. By the length of the sleeve 6 is meant herein the extent that the sleeve 6 has in the direction along the pipe string 10. The first attachment part 16 is provided with a first hook 28 which fits the bevel 12 (best seen in FIG. 4). The first hook 28 extends along the periphery of the pipe length 8, preferably in the entire width of the first attachment part 16. The first attachment part 16 is further provided with a first abutment surface 161 arranged to rest against the first end face 61 of the sleeve 6.

On the side of the first attachment part 16 that faces the second attachment part 18 in the position of application, the first attachment part 16 is formed with a pair of guiding lips 30. Internally in the first attachment part 16, a number of threaded bores 32 directed axially are arranged.

Correspondingly, the second attachment part 18 is provided with a second hook 34 fitting its bevel 12. The second attachment part 18 is further provided with a second abutment surface 181 arranged to rest against the second end face 62 of the sleeve 6.

On the side of the second attachment part 18 that faces the first attachment part 16 in the position of application, the second attachment part 18 is formed with a pair of guiding recesses 36 which cooperate with the guiding lips 30. The guiding lips 30 are axially displaceable in the guiding recesses 36, but prevent lateral displacement between the attachment parts 16, 18.

Both attachment parts 16, 18 further have internal sleeve-abutment surfaces 20, 21, which may rest against the sleeve 6, and pipe-abutment surfaces 22, which may rest against the pipe lengths 8. At their respective outward-projecting end portions, the attachment parts 16, 18 have conical sloping surfaces 24. Two cable recesses 26 extend through the attachment parts 16, 18.

Internally in the second attachment part 18, bolt bores 38 are arranged, which are concentric with respective threaded bores 32 in the first attachment part 16. A threaded bolt 40 is arranged in each bolt bore 38 and threaded bore 32. The threaded bolt 40 can be tightened by means of a key, not shown, which is inserted via an access opening 42. The diameter 44 of the access opening 42 is smaller than the largest external diameter 46 of the threaded bolt 40 to prevent the threaded bolt 40 from falling out of the fastening means 1. In this exemplary embodiment, the threaded bore 32, bolt bore 38 and threaded bolt 40 constitute a tightening device 41.

Before fitting to the sleeve 6, the first attachment part 16 and the second attachment part 18 are connected to each other by means of the threaded bolts 40.

When the cable 2, which may comprise at least energy or control cables of any kind, has been placed on the sleeve 6, the fastening means 1 is applied to the sleeve 6, as the cable 2 is being placed in the cable recess 26.

To clamp the cable 2 between the fastening means 1 and the sleeve 6, the height 48 of the cable recess 26 from the sleeve 6, when the fastening means 1 has been fitted, is smaller than the thickness 50 of the cable 2. It may therefore be necessary to use a clamp 52, see FIG. 5, to press the fastening means 1 towards the sleeve 6 until the sleeve-abutment surfaces 20 hit the sleeve 6.

Figure 3:
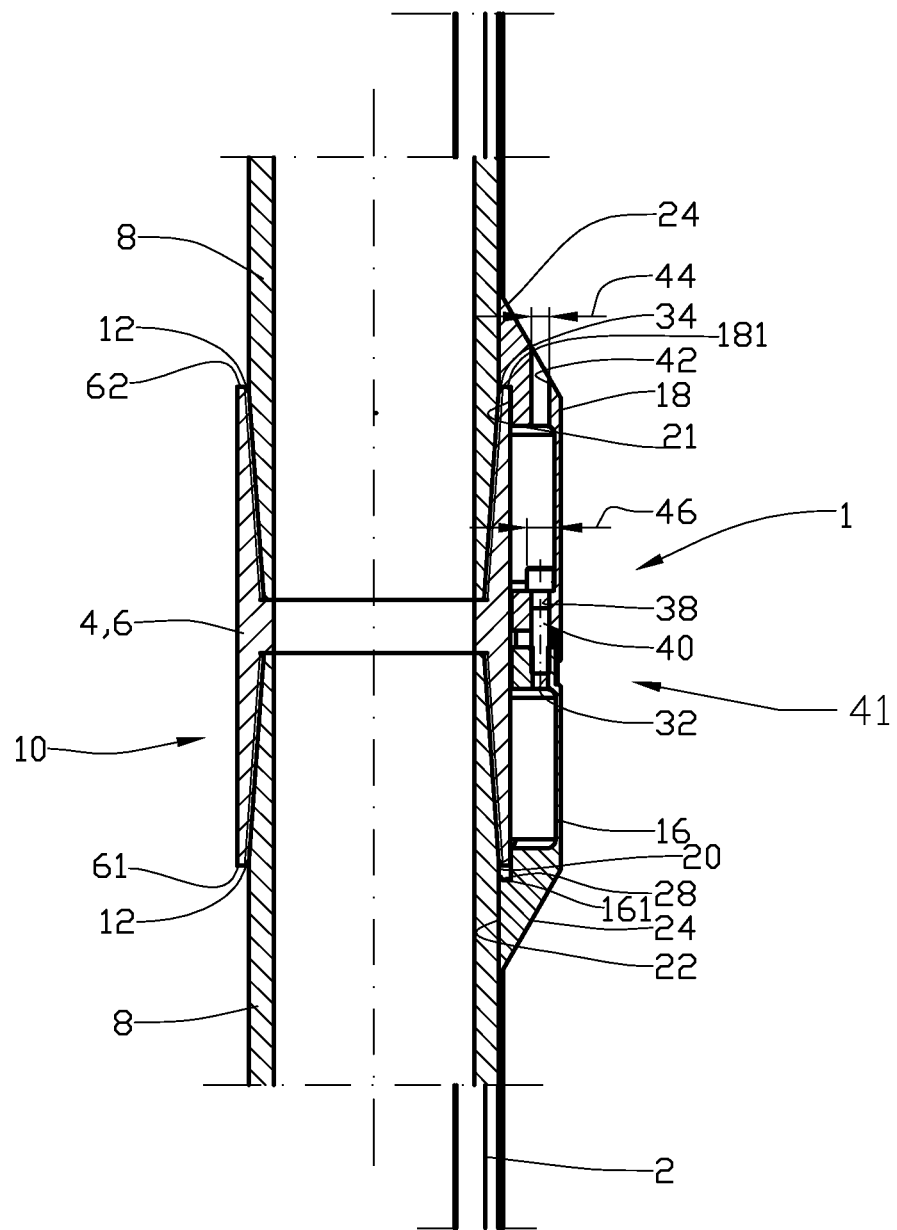
FIG. 3 shows a section II-II of FIG. 2.
Figure 4:
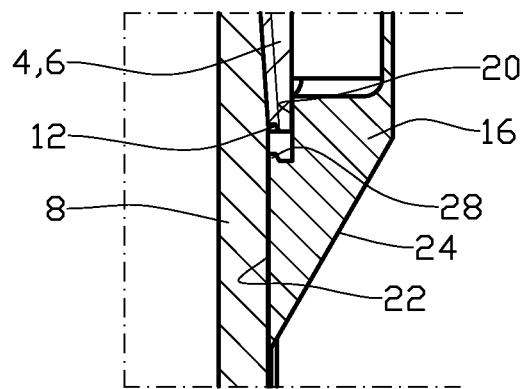
FIG. 4 shows a section of FIG. 3 on a larger scale.
Figure 5:
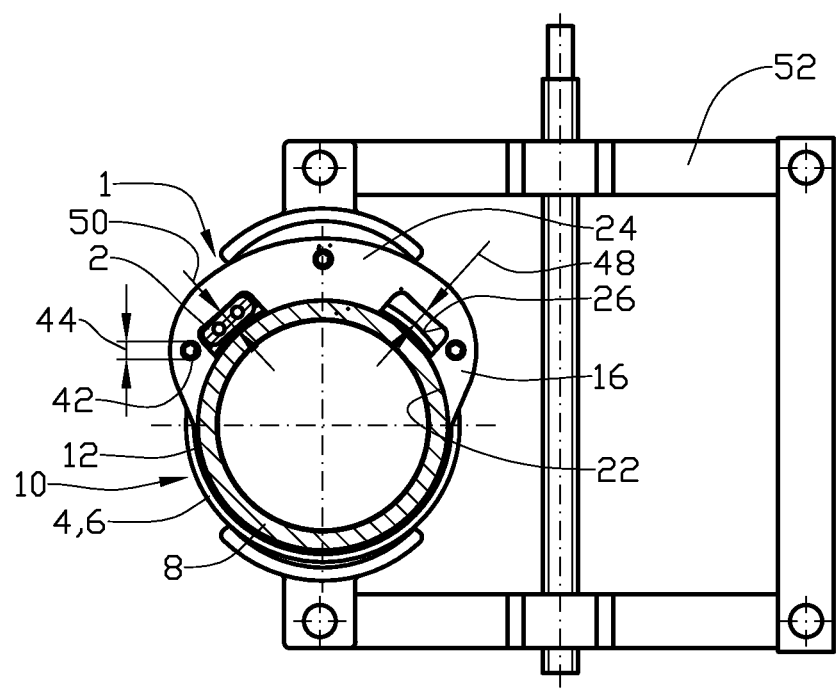
FIG. 5 shows the fastening means in the process of being fitted to the tubular body.

In FIG. 3, the second hook 34 is shown moved into its bevel 12, whereas the first hook 28 is outside its bevel 12. By inserting the screwing tool, not shown, through the access opening 42 and tightening the threaded bolt 40, the first hook 28 is moved into the bevel 12 while, simultaneously, the guiding lips 30 are moved inwards in the guiding recesses 36. Further tightening of the threaded bolt 40 tightens the first hook 28 and the second hook 34 in their respective bevels 12. The lateral interlocking of the attachment parts 16, 18, by means of the guiding lips 30, prevents the threaded bolts 40 from unintendedly coming loose.

Axial forces applied to the fastening means 1 will press the respective hook 28, 34 further into its bevel 12. Radial forces acting on the fastening means 1 will press the fastening means 1 further against the sleeve 6. The design of the fastening means 1 with sloping surfaces 24 and also a relatively smooth external surface 54, also contributes to the fastening means 1 being movable in a safe manner into a well not shown.

Figure 6:
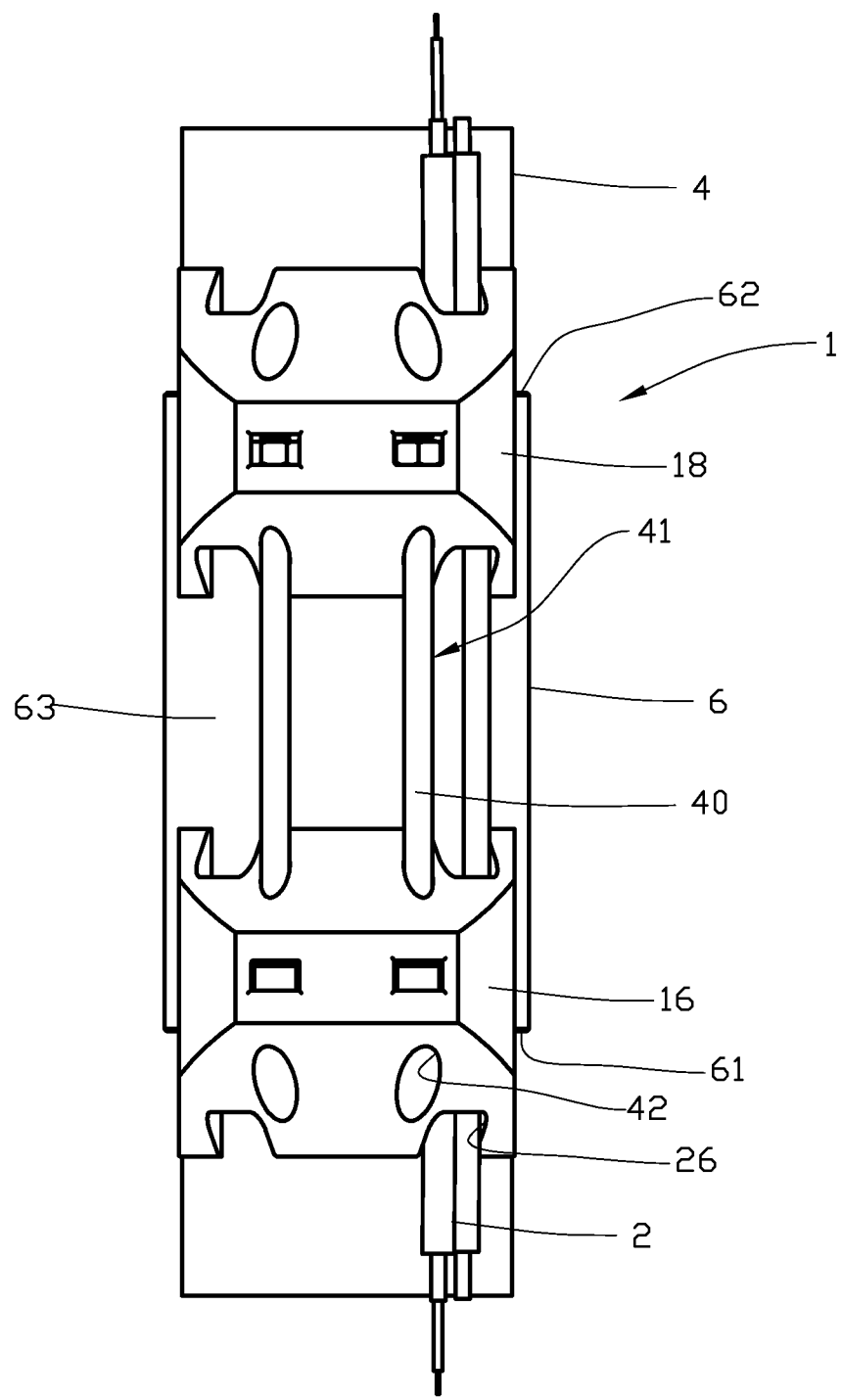
FIG. 6 shows a top view of a fastening means according to the invention.
Figure 7:
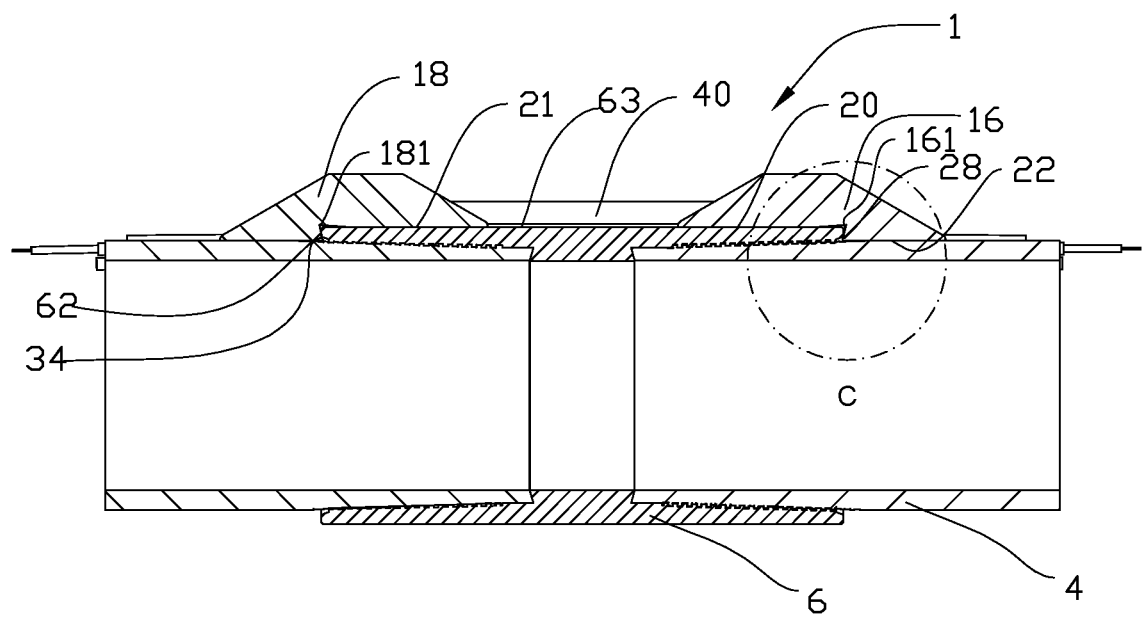
FIG. 7 shows the fastening means of FIG. 6 viewed from the side.
Figure 8:
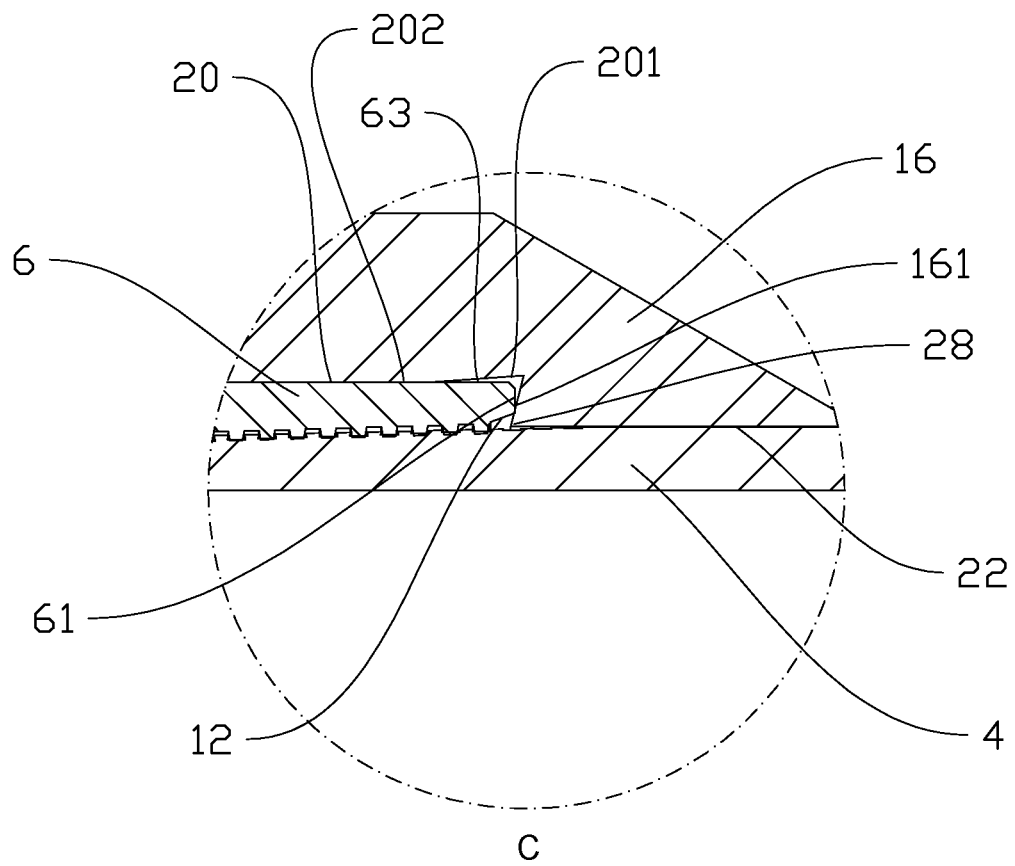
FIG. 8 shows a detail of FIG. 7.

Reference is now made to FIGS. 6-8 which show an embodiment of the new fastening means 1 according to the invention. The description in what follows will include what is new in relation to the invention described above in connection with FIGS. 1-5.

In this embodiment, the two attachment parts 16, 18 are placed in a spaced-apart manner and interconnected via the threaded bolts 40. In addition to having the same effect as in the applicant's earlier invention, namely tightening the hooks 28, 34 into their respective bevels 12, the tightening means 41 will also take over the function of the guiding lips 30 and the guiding recesses 36 from the exemplary embodiment above. When there is no need for the two attachment parts 16, 18 to engage with each other to prevent twisting of the fastening means 1, it is an advantage to make the attachment parts 16, 18 somewhat shorter to simplify production and fitting of the fastening means 1. A further advantage is that the fastening means 1 will be more flexible relative to the length of the sleeve 6. That is to say, the fastening means 1 can be adapted for different sleeve lengths just by changing the length of the threaded bolts 40.

As can be seen from FIG. 6, the two attachment parts 16, 18 are identical in design in this exemplary embodiment. This has the advantage of it being necessary to produce only one type of attachment part 16, 18 instead of two. In the exemplary embodiment shown, there are two cable recesses 26. It must be understood that, alternatively, there might have been just one cable recess 26, but to make it possible for the attachment parts 16, 18 to be kept identical, it would then have had to be centred.

In FIG. 7, it can be seen that the first hook 28 and the second hook 34 may be formed of a lower portion of the first abutment surface 161 (of the first attachment part 16) and the second abutment surface 181 (of the second attachment part 18), respectively, both the first abutment surface 161 and the second abutment surface 181 being slanted. In this way, the production of the attachment parts 16, 18 may be further simplified.

FIG. 8 shows a detail of one of the two attachment parts 16, 18. In what follows, reference numbers will only refer to the first attachment part 16. The pipe-abutment surface 22 of the attachment part 16 rests against the tubular body 4 and the sleeve-abutment surface 20 rests against the sleeve 6. The above-mentioned slanted abutment surface 161 rests against a portion of the first end face 61 of the sleeve 6. It can be seen from the figure that the sleeve-abutment surface 20 is divided into a first zone 201 and a second zone 202, the first zone 201 being at an angle to the second zone 202, so that the first zone 201 is out of contact with the external surface 63 of the sleeve 6. Thus, a cavity is formed between the sleeve 6 and the attachment part 16. This design has turned out to give a particularly good grip between the fastening means 1 and the sleeve 6. An explanation of this is that as the tightening device 41 (not shown) is tightened, so that the attachment parts 16, 18 are pressed towards each other, the first zone 201, 211 is pressed towards the external surface 63 of the sleeve 6 and the hook 28, 34 will be pressed in towards the bevel 12 of the sleeve 6. The cavity thus allows compression when the threaded bolts 40 are tightened. The main point is that the fastening means 1 is in contact with the sleeve 6 and the rest of the tubular body 4 over as large surfaces as possible; that is to say, the contact of the pipe-abutment surface 22 with the tubular body 4, and also the contact of the sleeve-abutment surface 20 and the abutment surface 161 with the sleeve 6 must be maximized. The clearance, or recess, between the external surface 63 of the sleeve 6 and the first zone 201 has turned out to give the desired effect. In this way, the fastening means will have increased resistance to twisting and can thus pass the above-mentioned vibration test.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A fastening means for attaching a cable to a tubular body, the tubular body comprising a sleeve having an external circumferential surface and extending from a first end face to a second end face in an axial direction, the fastening means comprising:
   a first attachment part arranged with a first abutment surface for resting against the first end face;
   a second attachment part arranged with a second abutment surface for resting against the second end face;
   both the first attachment part and the second attachment part including a through cable recess; and
   a tightening device for pulling the first attachment part and the second attachment part towards each other in the axial direction;
   wherein the first attachment part and the second attachment part are adjustably connected in a spaced-apart manner via the tightening device; and
   wherein the first attachment part and the second attachment part radially extend around only a portion of the external circumferential surface such that the first attachment part and the second attachment part are coupled to the sleeve after the cable is positioned proximate the tubular body.

2. The fastening means according to claim 1, wherein:
   the first attachment part is further arranged with a first sleeve-abutment surface arranged for contact with a portion of the external circumferential surface of the sleeve; and wherein
   the second attachment part is further arranged with a second sleeve-abutment surface arranged for contact with a portion of the external circumferential surface of the sleeve.

3. The fastening means according to claim 1, wherein both the first attachment part and the second attachment part are provided with a pipe abutment surface.

4. The fastening means according to claim 1, wherein the through cable recess of the first attachment part is in line with the through cable recess of the second attachment part.

5. The fastening means according to claim 1, wherein the first attachment part and the second attachment part are identical.

6. The fastening means according to claim 2, wherein the abutment surface is placed at an acute angle to the sleeve-abutment surface.

7. The fastening means according to claim 2, wherein each of the sleeve-abutment surfaces comprises:
   a first zone nearest to the abutment surface; and
   a second zone arranged for tight contact with the external circumferential surface of the sleeve in the position of application;
   the first zone being at least partially out of contact with the sleeve before the fastening means is tightened via of the tightening device.

8. The fastening means according to claim 1, wherein at least portions of the abutment surfaces are provided with friction-enhancing means for increased friction between the fastening means and the sleeve.

9. The fastening means according to claim 2, wherein at least a portion of the sleeve-abutment surfaces are provided with friction-enhancing means for increased friction between the fastening means and the sleeve.

10. The fastening means according to claim 3, wherein at least a portion of the pipe-abutment surfaces are provided with friction-enhancing means for increased friction between the fastening means and the tubular body.

11. A method for attaching a cable to a tubular body, wherein the tubular body comprises a sleeve having an external circumferential surface and extending from a first end face to a second end face in an axial direction, wherein the method comprises:
   arranging the cable proximate the sleeve on the tubular body;
   providing a fastening means comprising a first attachment part arranged with a first abutment surface and a second attachment part with a second abutment surface; and
   arranging the first attachment part and the second attachment part radially around a portion of the external circumferential surface of the sleeve such that the cable is arranged between the fastening means and the sleeve, the first abutment surface rests against the first end face, and the second abutment surface rests against the second end face.

12. The method according to claim 11, wherein the fastening means further comprises a tightening device, and the method further comprises tightening the tightening device to pull the first attachment part and the second attachment part towards each other in the axial direction.

13. A fastening assembly, comprising:
   at least one pipe length;
   a sleeve positioned around the at least one pipe length, the sleeve having an external circumferential surface and extending from a first end face to a second end face in an axial direction:
   at least one cable positioned proximate the external circumferential surface; and
   a fastening device configured to couple to the sleeve and thereby couple the at least one cable to the sleeve, wherein the fastening device comprises:
      a first attachment part having a first hook;
      a second attachment part having a second hook; and
      a tightening device for pulling the first attachment part and the second attachment part towards each other in the axial direction such that the first hook and the second hook are positioned between the at least one pipe length and the sleeve.

14. The fastening assembly of claim 13, wherein:
   the first attachment part further comprises a plurality of guiding lips positioned opposite the first hook; and
   the second attachment part further comprises a plurality of guiding recesses positioned opposite the second hook;
   wherein the plurality of guiding lips is configured to engage with the plurality of guiding recesses to prevent lateral displacement between the first attachment part and the second attachment part.

* * * * *